US011980918B2

(12) United States Patent
Kennedy

(10) Patent No.: US 11,980,918 B2
(45) Date of Patent: May 14, 2024

(54) HYDROBLASTING SYSTEM

(71) Applicant: Thompson Industrial Services, LLC, Sumter, SC (US)

(72) Inventor: Matthew Kennedy, Gilbert, SC (US)

(73) Assignee: Thompson Industrial Services, LLC., Sumter, SC (US)

( * ) Notice: Subject to any disclaimer, the term of this patent is extended or adjusted under 35 U.S.C. 154(b) by 515 days.

(21) Appl. No.: 17/403,128

(22) Filed: Aug. 16, 2021

(65) Prior Publication Data

US 2023/0051640 A1 Feb. 16, 2023

(51) Int. Cl.
*B08B 3/02* (2006.01)

(52) U.S. Cl.
CPC ....... *B08B 3/024* (2013.01); *B08B 2203/0211* (2013.01); *B08B 2203/0223* (2013.01)

(58) Field of Classification Search
CPC ...................................................... B08B 3/024
See application file for complete search history.

(56) References Cited

U.S. PATENT DOCUMENTS

| | | | |
|---|---|---|---|
| 5,238,191 | A | 8/1993 | Gaymon |
| 5,582,349 | A | 12/1996 | Boisture |
| 2012/0255578 | A1 | 10/2012 | Robinson |
| 2017/0106412 | A1 | 4/2017 | Bonneau et al. |
| 2018/0010867 | A1 | 1/2018 | Van Fleet |

OTHER PUBLICATIONS

International Search Report and Written Opinion PCT/US 22/40408, mailed Dec. 20, 2022, 7 pages.

*Primary Examiner* — Jason Y Ko
(74) *Attorney, Agent, or Firm* — Richard L. Sampson; Davis, Malm, D'Agostine, P.C.

(57) ABSTRACT

A hydroblaster includes a carriage. A plurality of bearings is rotatably mounted to the carriage at a bottom portion of the carriage. A plurality of legs is mounted to the carriage at the bottom portion of the carriage. The plurality of legs extend downwardly from the bottom portion of the carriage past the plurality of bearings. A fluid conduit is disposed on the carriage at a top portion of the carriage. A first motor is mounted to the carriage at the top portion of the carriage. The first motor is coupled to the fluid conduit such that the first motor is operable to rotate the fluid conduit. A second motor is mounted to the carriage at the top portion of the carriage. The second motor is coupled to a gear positioned at the bottom portion of the carriage such that the second motor is operable to rotate the gear.

20 Claims, 6 Drawing Sheets

HYDROBLASTING SYSTEM

FIELD OF THE INVENTION

The present subject matter relates generally to hydroblasting systems.

BACKGROUND OF THE INVENTION

Hydroblasters are utilized in industrial settings to clean machinery, such as boilers, heat exchangers, tanks, pipes, etc. Hydroblasters utilize high pressure fluids to remove bio-fouling, waste material, and debris. For example, hydroblasters can remove scale from within boilers using pressurized chemical fluids. Known hydroblasters have drawbacks, such limited durability requiring frequent rebuilds.

BRIEF DESCRIPTION OF THE INVENTION

Aspects and advantages of the invention will be set forth in part in the following description, or may be apparent from the description, or may be learned through practice of the invention.

In an example embodiment, a hydroblaster includes a carriage. A plurality of bearings is rotatably mounted to the carriage at a bottom portion of the carriage. A plurality of legs is mounted to the carriage at the bottom portion of the carriage. The plurality of legs extend downwardly from the bottom portion of the carriage past the plurality of bearings. A fluid conduit is disposed on the carriage at a top portion of the carriage. A first motor is mounted to the carriage at the top portion of the carriage. The first motor is coupled to the fluid conduit such that the first motor is operable to rotate the fluid conduit. A second motor is mounted to the carriage at the top portion of the carriage. The second motor is coupled to a gear positioned at the bottom portion of the carriage such that the second motor is operable to rotate the gear.

In another example embodiment, a hydroblaster includes a track and a carriage. A plurality of bearings is rotatably mounted to the carriage at a bottom portion of the carriage. The carriage is slidably mounted on the track by the plurality of bearings. A plurality of legs is mounted to the carriage at the bottom portion of the carriage. The plurality of legs extend downwardly from the bottom portion of the carriage past the plurality of bearings. A fluid conduit is disposed on the carriage at a top portion of the carriage. A first hydraulic motor is mounted to the carriage at the top portion of the carriage. The first hydraulic motor is coupled to the fluid conduit such that the first hydraulic motor is operable to rotate the fluid conduit. A second hydraulic motor is mounted to the carriage at the top portion of the carriage. The second hydraulic motor is coupled to a gear positioned at the bottom portion of the carriage such that the second hydraulic motor is operable to rotate the gear. The gear is meshed with a gear rack of the track such that the second hydraulic motor is configured to translate the carriage on the track by rotating the gear.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
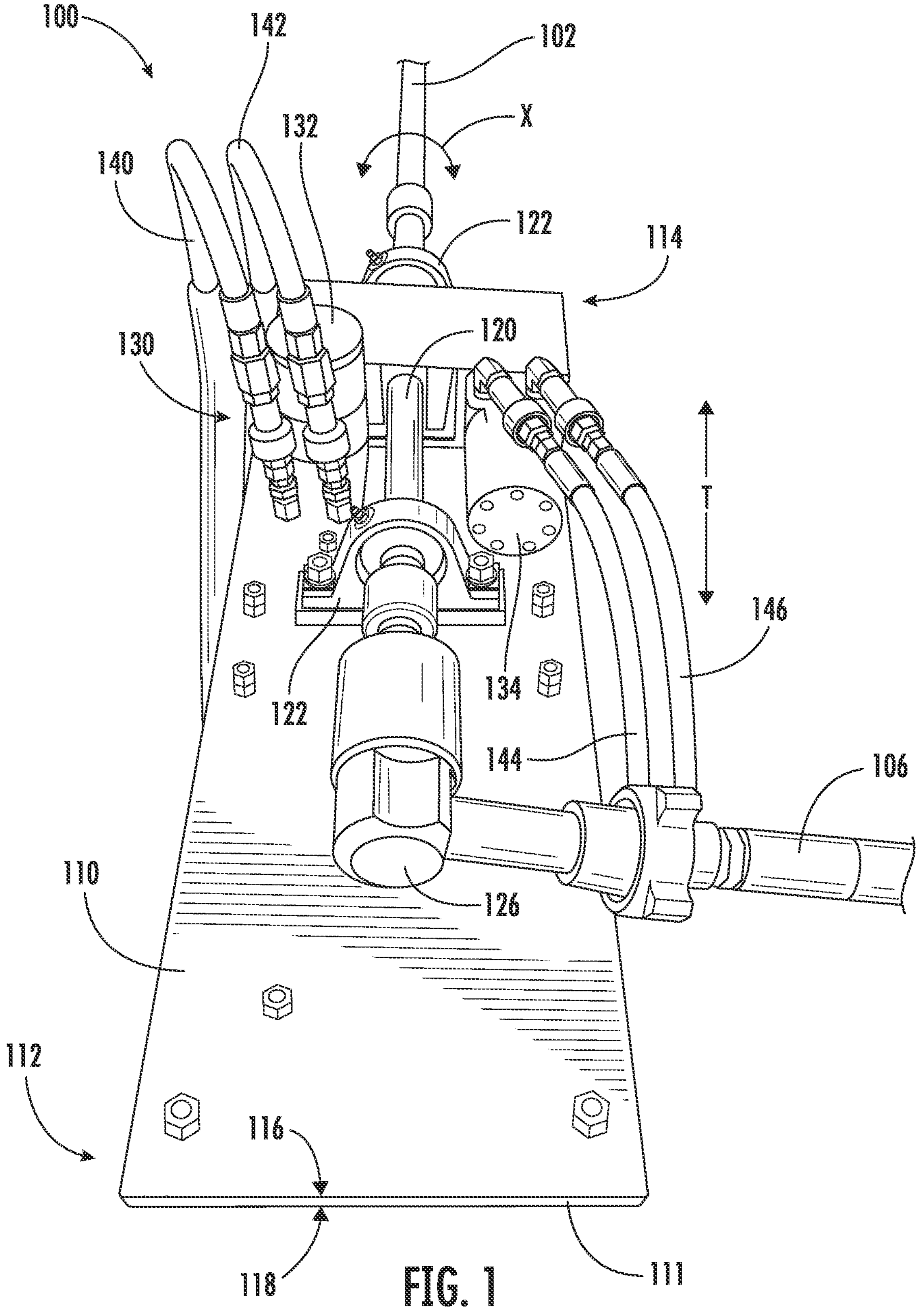
FIG. 1 is a perspective view of a hydroblaster according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “includes” and “including” are intended to be inclusive in a manner similar to the term “comprising.” Similarly, the term “or” is generally intended to be inclusive (i.e., “A or B” is intended to mean “A or B or both”). Approximating language, as used herein throughout the specification and claims, is applied to modify any quantitative representation that could permissibly vary without resulting in a change in the basic function to which it is related. Accordingly, a value modified by a term or terms, such as “about,” “approximately,” and “substantially,” are not to be limited to the precise value specified. In at least some instances, the approximating language may correspond to the precision of an instrument for measuring the value. For example, the approximating language may refer to being within a ten percent (10%) margin.

FIGS. 1 through 5 are various views of a hydroblaster 100 according to an example embodiment of the present subject matter. Hydroblaster 100 may be used to assist with cleaning various industrial equipment. For example, hydroblaster 100 may be used to clean boilers, heat exchangers, tanks, pipes, etc. During operation, highly pressurized fluid is delivered to the industrial equipment to remove bio-fouling, waste material, and debris. The pressure of fluid exiting hydroblaster 100 can range from ten-thousand pounds per square inch to forty-thousand pounds per square inch (10,000 psi to 40,000 psi). In addition, hydroblaster 100 may apply a push-force onto debris, e.g., within pipes. The push-force may be up to fifty pounds (50 lbs.) in certain example embodiments.

Figure 5:
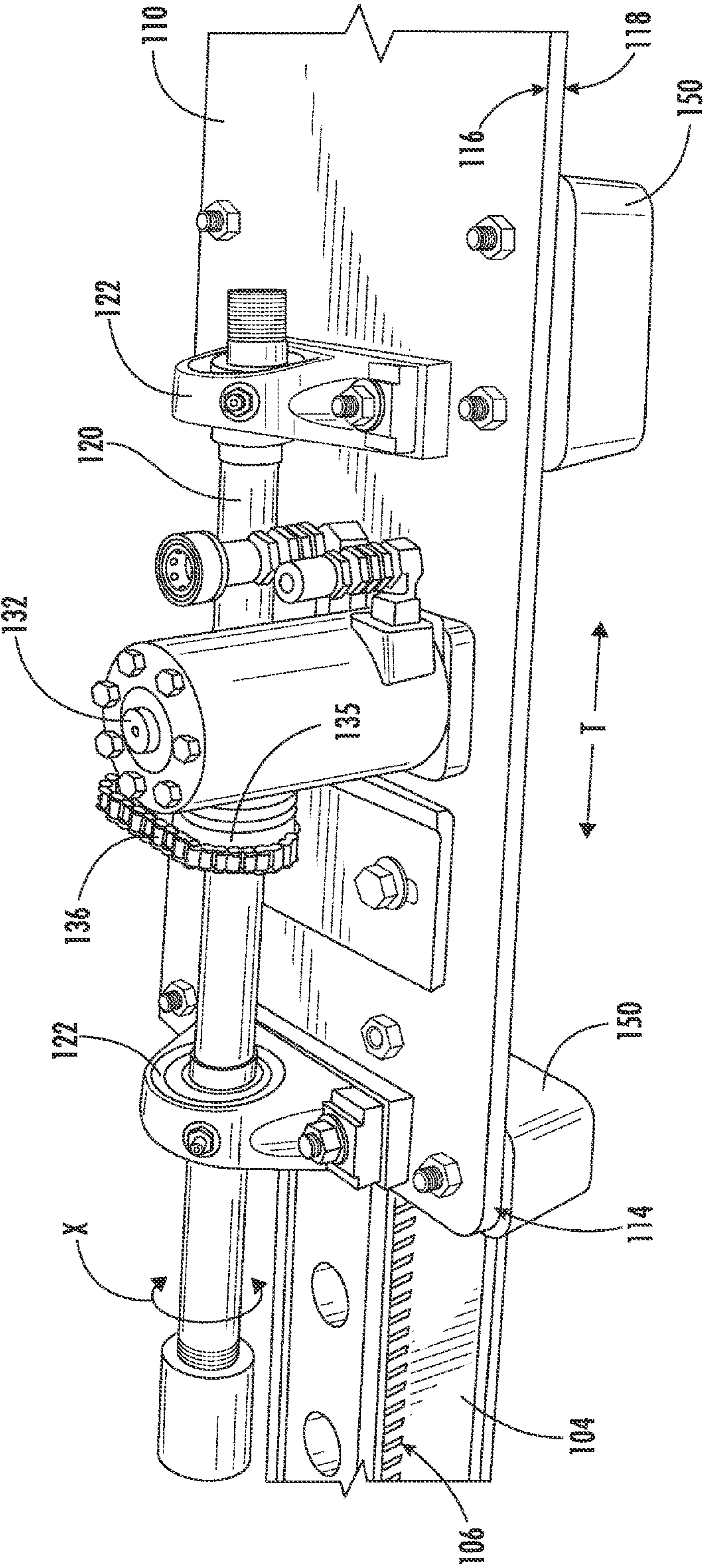
FIG. 5 is another perspective view of the example hydroblaster of FIG. 1.

Hydroblaster 100 includes a carriage 110. Carriage 110 is configured to translate, e.g., on a track 104 (FIG. 5). For instance, carriage 110 may slide along a transverse direction T on track 104. Carriage 110 may support or carry other components of hydroblaster 100. Thus, the components on carriage 110 may translate with carriage 110 during operation of hydroblaster 100.

Carriage 110 may include a plate 111. Plate 111 may have a top surface 116 and a bottom surface 118. Top surface 116 and bottom surface 118 may be spaced apart and positioned opposite each other on plate 111. Plate 111 may have any suitable shape. For example, plate 111 may have a generally rectangular shape. Various components of hydroblaster 100, such as a fluid conduit 120, a first motor 134, a second motor 132, etc., may be mounted (e.g., bolted) to plate such that the components translate with carriage 110 during operation of hydroblaster 100.

Figure 2:
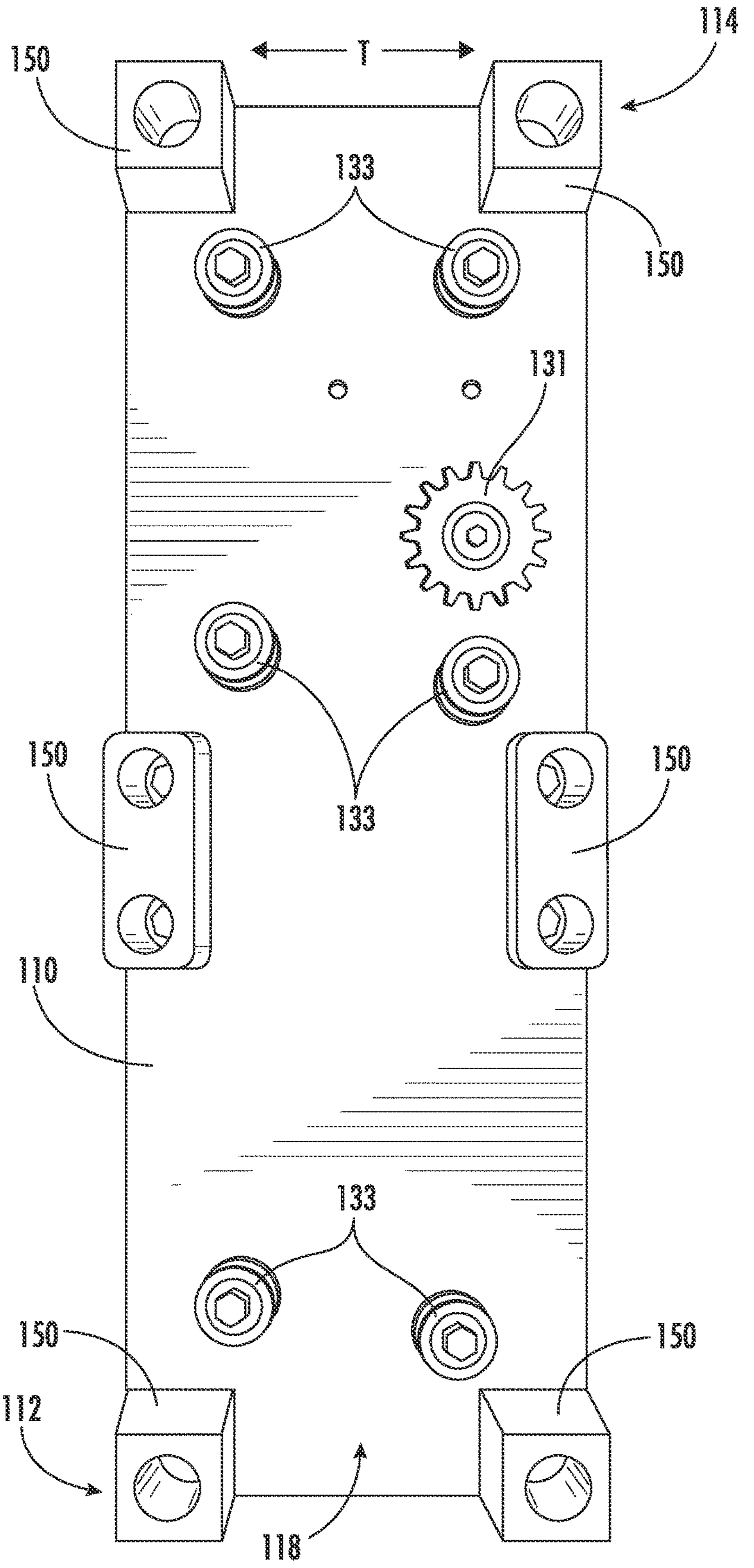
FIG. 2 is a bottom, plan view of a carriage of the example hydroblaster of FIG. 1.
Figure 3:
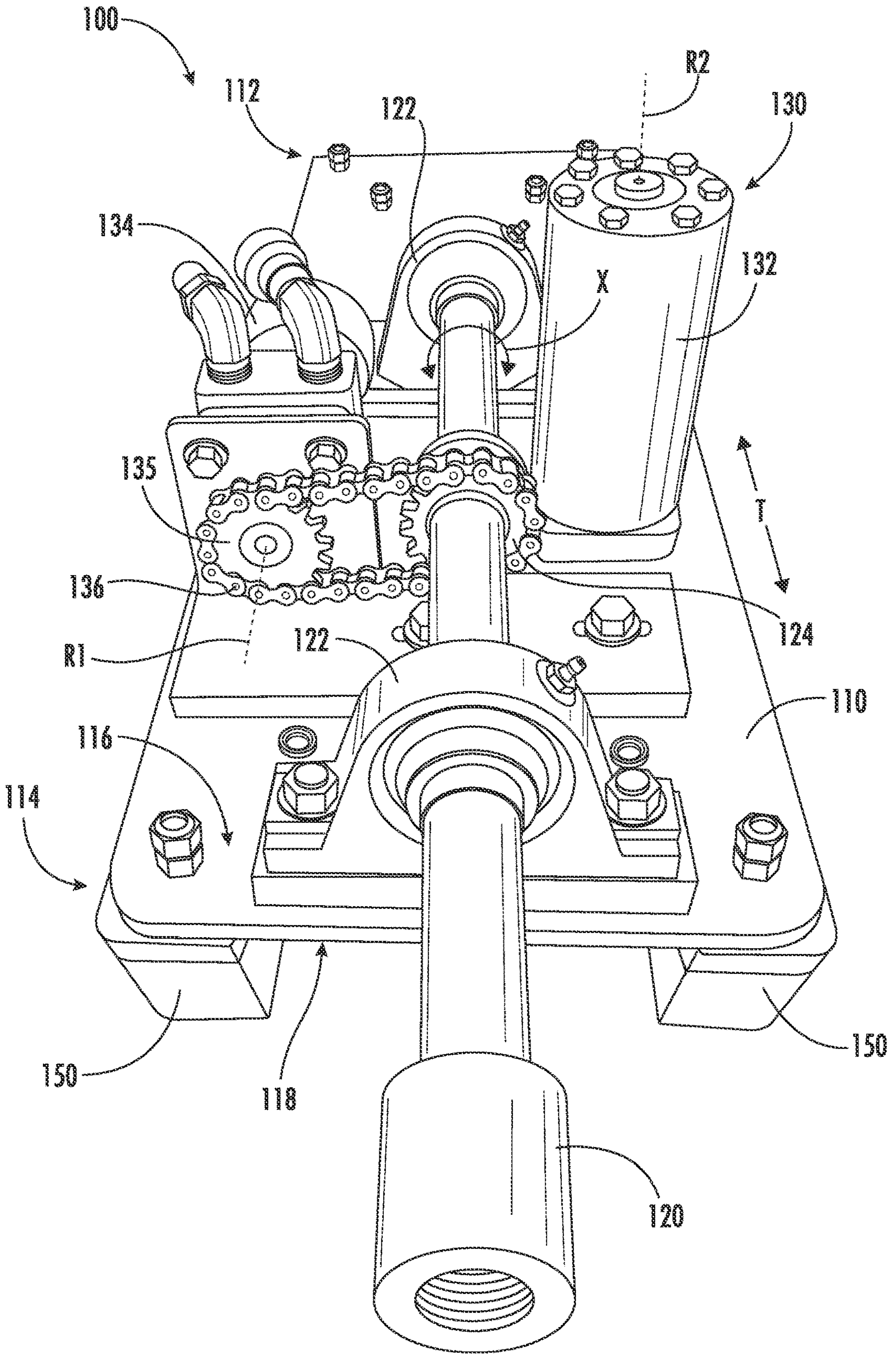
FIG. 3 is another perspective view of the example hydroblaster of FIG. 1.
Figure 4:
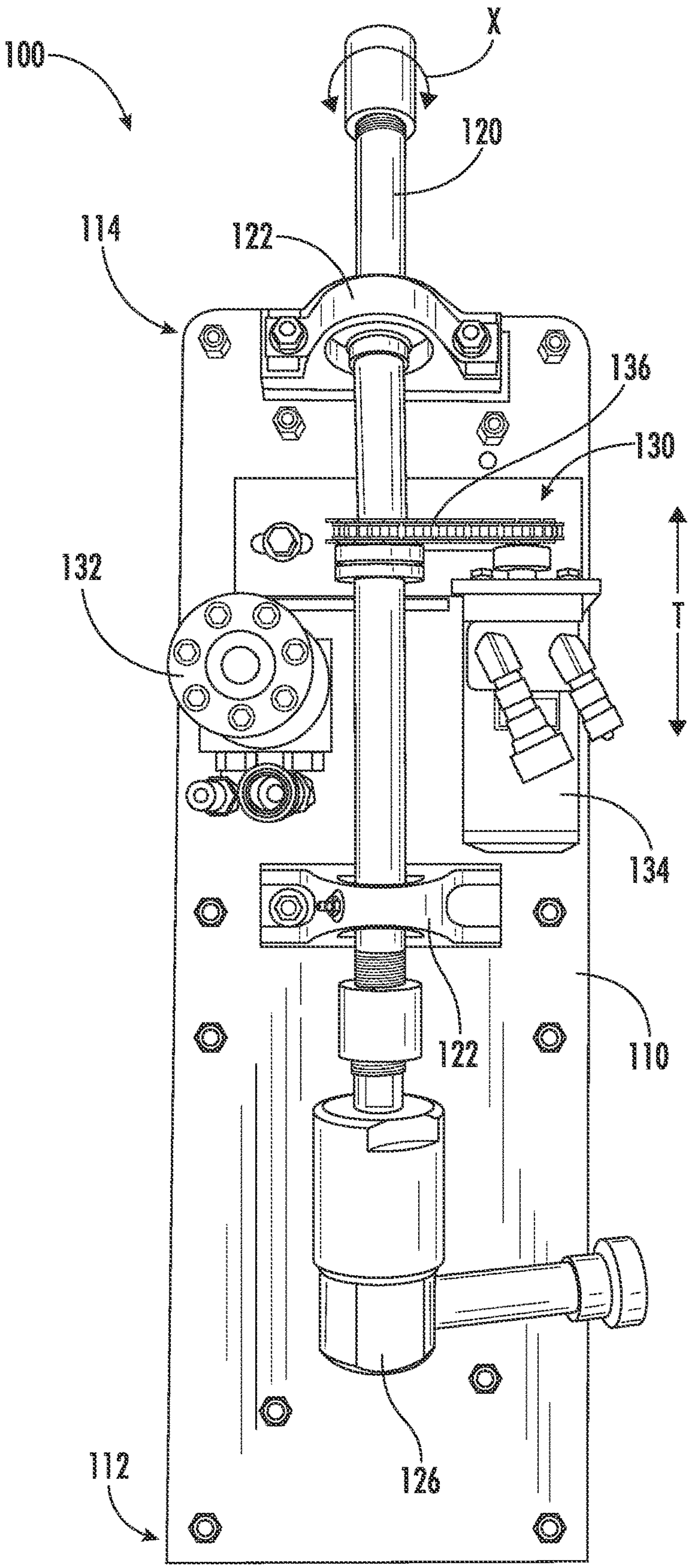
FIG. 4 is a top, plan view of the example hydroblaster of FIG. 1.

As shown in FIG. 2, hydroblaster 100 also includes a plurality of track rollers or bearings 133, such as rolling-element bearings. Bearings 133 may be rotatably mounted to carriage 110 at a bottom portion of carriage 110, such as bottom surface 118 of plate 111. Bearing 133 may slidably mount carriage 110 on track 104. For example, bearings 133 may roll on track 104 to slidably mounted to carriage 110 to track 104. Pairs of bearings 133 may be laterally spaced (e.g., perpendicular to the transverse direction T) on carriage 110, and track 104 may be disposed between the pairs of bearings 133. As an example, bearings 133 may include no less than four bearings. A first two of bearings 133 may be positioned proximate a first end portion 112 of carriage 110, and a second two of bearings 133 may be positioned proximate a second end portion 114 of carriage 110. First and second end portions 112, 114 of carriage 110 may be spaced apart and positioned opposite each other, e.g., along the transverse direction T. By positioning pairs of bearings at both of first and second end portions 112, 114 of carriage 110, the weight of carriage 110 and components thereon may be distributed, e.g., along the transverse direction T, on track 104.

Hydroblaster 100 further includes a plurality of legs 150. Legs 150 may be mounted to carriage 110 at the bottom portion of carriage 110, such as bottom surface 118 of plate 111. Legs 150 may extend downwardly from the bottom portion of carriage 110 past bearings 133. Thus, e.g., bearings 133 may be disposed between bottom surface 118 of plate 111 and the distal ends of legs 150. As an example, legs 150 may include no less than four legs. A first two of legs 150 may be positioned proximate first end portion 112 of carriage 110, and a second two of legs 150 may be positioned proximate second end portion 114 of carriage 110. Legs 150 may also be positioned at an outer portion of carriage 110, e.g., such that bearings 130 are positioned between legs 150, e.g., along a direction perpendicular to the transverse direction T, on carriage 110. In certain example embodiments, legs 150 may be positioned at an outer edge of plate 111. Legs 150 may support carriage 110, e.g., when carriage 110 is removed from track 104. By supporting carriage 110 with legs 150, bearings 133 may be protected. For instance, bearings 133 may not contact a floor, table, etc. on which legs 150 support carriage 110 when carriage 110 is removed from track 104, e.g., due to legs 150 extending past bearings 133 along a direction perpendicular to bottom surface 118 of plate 111.

A fluid conduit 120 is disposed on carriage 110. For example, fluid conduit 120 may be positioned at a top portion of carriage 110, such as top surface 116 of plate 111. Fluid conduit 120 may be rotatably mounted on carriage 110. Thus, fluid conduit 120 may rotate in either direction X on carriage 110. A pair of pillow blocks 122 may be mounted to carriage 110, e.g., at top surface 116 of plate 111. Fluid conduit 120 may be rotatably mounted to carriage 110 with pillow blocks 122.

Fluid conduit 120 is configured for receiving a flow of pressurized fluid from a coupling 126 disposed upstream of fluid conduit 120. Fluid conduit 120 is also configured for directing a flow of pressurized fluid to one or more pipe segments 102 disposed downstream of fluid conduit 120. Thus, e.g., a hose or other conduit may be connected to coupling 126 and receive highly pressurized fluid from a pump or other source. Coupling 126 may be rotatably mounted to fluid conduit 120. Thus, e.g., coupling 126 may not rotate with fluid conduit 120 in either direction X on carriage 110.

Hydroblaster 100 may also include an actuation assembly 130. Actuation assembly 130 may include a first motor 132 and a second motor 132. First motor 134 may be mounted to carriage 110. For instance, first motor 134 may be positioned at the top portion of carriage 110, such as top surface 116 of plate 111. First motor 134 may also be coupled to fluid conduit 120. Thus, first motor 134 may be operable to rotate fluid conduit 120, e.g., in either of the directions X.

Like first motor 134, second motor 132 may be mounted to carriage 110. For instance, second motor 132 may be positioned at the top portion of carriage 110, such as top surface 116 of plate 111. Second motor 132 may be coupled to a gear 131 (FIG. 2). Gear 131 may be positioned at the bottom portion of carriage 110. Thus, gear 131 may be positioned opposite second motor 132 about carriage 110. As an example, a shaft of second motor 132 may extend through plate 111 to gear 131. Gear 131 may be a spur gear in certain example embodiments.

Second motor 132 may be operable to rotate gear 131. For example, second motor 132 may operate to rotate gear 131 in order to translate carriage 110, e.g., along the transverse direction T, on track 104. Moreover, gear 131 may be meshed with a gear rack 106 of track 104. By rotating gear 131, second motor 132 may translate carriage 110, e.g., along the transverse direction T, on track 104 due to the meshing of gear 131 with gear rack 106. Gear rack 106 may include a plurality of teeth distributed along the transverse direction T on track 104.

First and second motors 132, 134 may be any suitable motor, such as hydraulic motors. Thus, e.g., first and second motors 132, 134 may be supplied with pressurized fluid, such as hydraulic fluid, to operate first and second motors 132, 134. In particular, pressurized fluid may be supplied to first motor 134 through a supply line 140 and directed out of first motor 134 through a return line 142, and pressurized fluid may be supplied to second motor 132 through a supply line 144 and directed out of second motor 132 through a return line 146. A pump, compressor, etc. may supply the pressurized fluid to first and second motors 132, 134. It will be understood that one or more of first and second motors 132, 134 may be an electric motor in alterative example embodiments.

Actuation assembly 130 may also include a flexible traction device coupling first motor 134 to fluid conduit 120. The flexible traction device may include a first gear 135, a second gear 124, and a chain 136. First gear 135 and second gear 124 may be spur gears in certain example embodiments. First gear 135 may be connected to first motor 135, e.g., directly to a shaft of first motor 135. Thus, first motor 134 may be operable to rotate first gear 135. Second gear 124 may be connected to fluid conduit 120. For instance, second gear 124 may be fixed and rotatable with fluid conduit 120. Chain 136 may extend between and connect first and second gears 135, 124. For instance, chain 136 may be meshed with both first and second gears 135, 124. Due to chain 136, first motor 134 may drive rotation of fluid conduit 120. Moreover, first motor 134 may be operable to rotate first gear 135, and rotation of first gear 135 may be transferred to second gear 124 and fluid conduit 120 by chain 136. It will be understood that, in alternative example embodiments, flexible traction device may include wheels and a belt that couple first motor 134 to fluid conduit 120 a similar manner to that described above for first gear 135, second gear 124, and chain 136. As another example embodiment, first motor 134 may be coupled to fluid conduit 120 by a spur gear train or any other suitable rotational connection.

The arrangement of first and second motors 132, 134 on carriage 110 may be selected to assist with rotation of fluid conduit 120 and translation of carriage 110 with first and second motors 132, 134. For example, an axis of rotation R1 of first motor 134 may be oriented substantially perpendicular to an axis of rotation R2 of second motor 132. In certain example embodiments, axis of rotation R1 of first motor 134 may be oriented substantially horizontal, and axis of rotation R2 of second motor 132 may be oriented substantially vertical.

During operation of hydroblaster 100, pressurized fluid is supplied to fluid conduit 120, e.g., via coupling 126. The pressurized fluid may flow into one or more pipe segments 102 connected to fluid conduit 120. The pressurized fluid may exit pipe segments 102 at a nozzle disposed at the end of pipe segments 102. The pressurized fluid may exit nozzle, e.g., perpendicular to the transverse direction T. The pipe segments 102 may be inserted into industrial equipment, e.g., a boiler, to remove waste material and debris. Hydroblaster 100 may translate carriage 110 on track 104 and/or rotate fluid conduit 120 to facilitate cleaning of the industrial equipment by hydroblaster 100.

An operator of hydroblaster 100 may selectively operate first motor 134 and second motor 132 to translate carriage 110 on track 104 and/or rotate fluid conduit 120. For example, the user may activate first motor 134 to rotate fluid conduit 120, e.g., either clockwise or counter-clockwise. By rotating fluid conduit 120, the nozzle at the end of pipe segments 102 may also rotate. Thus, the pressurized fluid exiting pipe segments 102 at the nozzle may sweep the industrial equipment to facilitate cleaning of the industrial equipment by hydroblaster 100. The user may also activate second motor 132 to translate carriage 110 on track 106, e.g., along the transverse direction T. By translating carriage 110, the nozzle at the end of pipe segments 102 may also translate. Thus, the pressurized fluid exiting pipe segments 102 at the nozzle may move within the industrial equipment to facilitate cleaning of the industrial equipment by hydroblaster 100. In addition, translating carriage 110 may cause the nozzle at the end of pipe segments 102 to impact debris within the industrial equipment, and the nozzle may apply a push force on such debris (e.g., up to fifty pounds) to facilitate cleaning of the industrial equipment by hydroblaster 100.

Carriage 110 may also include features for allowing a user of hydroblaster 100 to selectively disengage second motor 132 from track 104. When second motor 132 engages track 104, movement of carriage 110 on track 104, e.g., along the transverse direction T may be limited by the resistance of second motor 132. Conversely, carriage 110 may move freely on track 104 when second motor 132 is disengaged from track 104. Thus, a user of hydroblaster 100 may more easily reposition carriage along the transverse direction T on track 110 by disengaging second motor 132 from track 104.

Figure 6:
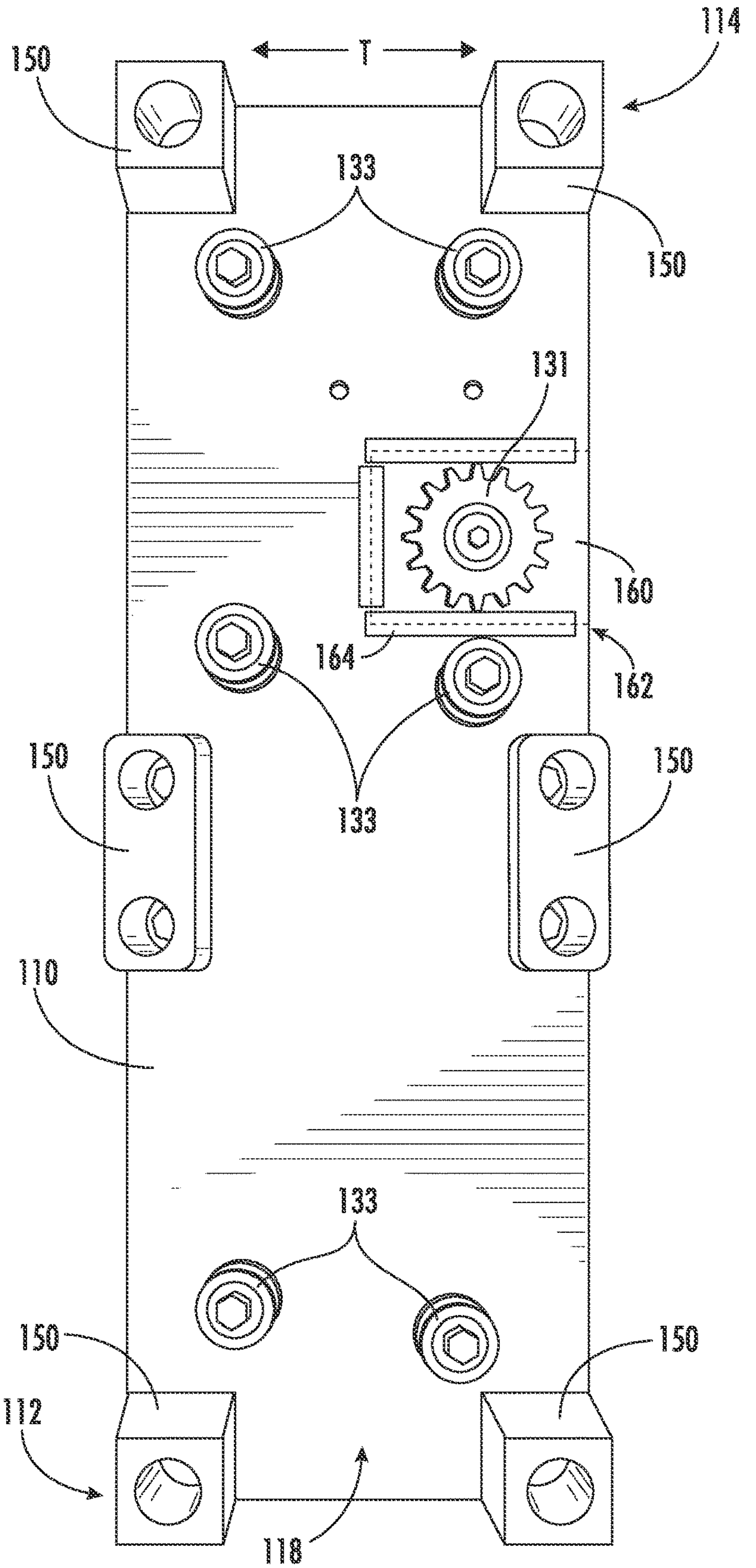
FIG. 6 is a bottom, plan view of a carriage of a hydroblaster according to another example embodiment of the present subject matter.

As shown in FIG. 6, second motor 132 may be mounted on a plate 160 that is movable relative to carriage 110, e.g., along a lateral direction that is perpendicular to the transverse direction T. For instance, plate 160 may slide on one or more guides 164 mounted to carriage 110 at a slot 162. Guides 164 may extend from carriage 110 into or over slot 162. Although only one side of carriage 110 is shown in FIG. 6, it will be understood that one or more guides 164 may also be mounted to carriage 110 on the opposite side of carriage 110, which is not shown in FIG. 6. Plate 160 may be received between the guides 164 on the two sides of carriage 110 such that plate 160 is slidable, e.g., along the lateral direction between guides 164.

By moving plate 160 relative to carriage 110, a user of hydroblaster 100 may selectively disengage second motor 132 from track 104. As an example, the user may fully insert plate 160 within slot 162 in order to engage second motor 132 with track 104, e.g., such that gear 131 meshes with gear rack 106 of track 104. Conversely, the user may at least partially remove plate 160 from slot 162 in order to disengage second motor 132 from track 104, e.g., such that gear 131 is unmeshed from gear rack 106 of track 104. A latch, pin, or other suitable securement mechanism may selectively mount plate 160 to carriage, e.g., such that plate 160 is fully inserted within slot 162 and gear 131 meshes with gear rack 106 of track 104, in order to prevent unintended disengagement of second motor 132 from track 104. In addition, hydroblaster may include features for limiting movement of plate 160 relative to carriage 110, e.g., along the lateral direction. In particular, one or more of guides 164 may include a slotted hole (not shown), e.g., that is elongated along the lateral direction, and a bolt, pin, etc. that is fixed to plate 110 may be received within the slotted hole in order to limit the movement of plate 160 relative to carriage 110, e.g., along the lateral direction, e.g., to no less than about a quarter of an inch (¼") and/or no more than about three-eighths of an inch (⅜").

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hydroblaster, comprising:

a carriage;

a plurality of bearings rotatably mounted to the carriage at a bottom portion of the carriage;

a plurality of legs mounted to the carriage at the bottom portion of the carriage, the plurality of legs extending downwardly from the bottom portion of the carriage past the plurality of bearings;

a fluid conduit disposed on the carriage at a top portion of the carriage;

a first motor mounted to the carriage at the top portion of the carriage, the first motor coupled to the fluid conduit such that the first motor is operable to rotate the fluid conduit; and a second motor mounted to the carriage at the top portion of the carriage, the second motor coupled to a gear positioned at the bottom portion of the carriage such that the second motor is operable to rotate the gear.

2. The hydroblaster of claim 1, wherein:

the carriage comprises a plate;

the plurality of bearings and the plurality of legs are positioned at a bottom surface of the plate; and the fluid conduit, the first motor, and the second motor are positioned at a top surface of the plate.

3. The hydroblaster of claim 1, wherein the first and second motors are hydraulic motors.

4. The hydroblaster of claim 1, further comprising a pair of pillow blocks, the fluid conduit rotatably mounted to the carriage with the pair of pillow blocks.

5. The hydroblaster of claim 1, further comprising a track, the carriage slidably mounted on the track by the plurality of bearings, the gear meshed with a gear rack of the track, the second motor configured to translate the carriage on the track by rotating the gear.

6. The hydroblaster of claim 1, further comprising a flexible traction device coupling the first motor to the fluid conduit.

7. The hydroblaster of claim 6, wherein the flexible traction device comprises a first gear, a second gear, and a chain, wherein the first gear is connected to the first motor, the second gear is connected to the fluid conduit, and the chain extends between and connects the first and second gears.

8. The hydroblaster of claim 1, wherein the plurality of bearings comprises no less than four bearings, a first two of the plurality of bearings positioned proximate a first end portion of the carriage, a second two of the plurality of bearings positioned proximate a second end portion of the carriage.

9. The hydroblaster of claim 1, wherein the plurality of legs comprises no less than four legs, a first two of the plurality of legs positioned proximate a first end portion of the carriage, a second two of the plurality of legs positioned proximate a second end portion of the carriage.

10. The hydroblaster of claim 1, wherein an axis of rotation of the first motor is oriented substantially perpendicular to an axis of rotation of the second motor.

11. The hydroblaster of claim 1, wherein the plurality of legs are positioned at an outer portion of the carriage.

12. A hydroblaster, comprising:

a track;

a carriage;

a plurality of bearings rotatably mounted to the carriage at a bottom portion of the carriage, the carriage slidably mounted on the track by the plurality of bearings;

a plurality of legs mounted to the carriage at the bottom portion of the carriage, the plurality of legs extending downwardly from the bottom portion of the carriage past the plurality of bearings;

a fluid conduit disposed on the carriage at a top portion of the carriage;

a first hydraulic motor mounted to the carriage at the top portion of the carriage, the first hydraulic motor coupled to the fluid conduit such that the first hydraulic motor is operable to rotate the fluid conduit; and a second hydraulic motor mounted to the carriage at the top portion of the carriage, the second hydraulic motor coupled to a gear positioned at the bottom portion of the carriage such that the second hydraulic motor is operable to rotate the gear, the gear meshed with a gear rack of the track such that the second hydraulic motor is configured to translate the carriage on the track by rotating the gear.

13. The hydroblaster of claim 12, wherein:

the carriage comprises a plate;

the plurality of bearings and the plurality of legs are positioned at a bottom surface of the plate; and the fluid conduit, the first hydraulic motor, and the second hydraulic motor are positioned at a top surface of the plate.

14. The hydroblaster of claim 12, further comprising a pair of pillow blocks, the fluid conduit rotatably mounted to the carriage with the pair of pillow blocks.

15. The hydroblaster of claim 12, further comprising a flexible traction device coupling the first motor to the fluid conduit.

16. The hydroblaster of claim 15, wherein the flexible traction device comprises a first gear, a second gear, and a chain, wherein the first gear is connected to the first motor, the second gear is connected to the fluid conduit, and the chain extends between and connects the first and second gears.

17. The hydroblaster of claim 12, wherein the plurality of bearings comprises no less than four bearings, a first two of the plurality of bearings positioned proximate a first end portion of the carriage, a second two of the plurality of bearings positioned proximate a second end portion of the carriage.

18. The hydroblaster of claim 12, wherein the plurality of legs comprises no less than four legs, a first two of the plurality of legs positioned proximate a first end portion of the carriage, a second two of the plurality of legs positioned proximate a second end portion of the carriage.

19. The hydroblaster of claim 12, wherein an axis of rotation of the first motor is oriented substantially perpendicular to an axis of rotation of the second motor.

20. The hydroblaster of claim 12, wherein the second hydraulic motor is positioned on a plate that is movable relative to the carriage, the gear selectively unmeshed from the gear rack of the track by moving the plate relative to the carriage.

* * * * *